March 2, 1926.  
J. S. EDWARDS  
BIRD STAND  
Filed April 10, 1925

March 2, 1926. 1,575,101
J. S. EDWARDS
BIRD STAND
Filed April 10, 1925 2 Sheets-Sheet 2

J. S. Edwards,
INVENTOR
BY Victor J. Evans
ATTORNEY

WITNESS:

Patented Mar. 2, 1926.

1,575,101

UNITED STATES PATENT OFFICE.

JOSEPH S. EDWARDS, OF LONG BEACH, CALIFORNIA.

BIRD STAND.

Application filed April 10, 1925. Serial No. 22,224.

*To all whom it may concern:*

Be it known that I, JOSEPH S. EDWARDS, a citizen of the United States, residing at Long Beach, in the county of Los Angeles and State of California, have invented new and useful Improvements in Bird Stands, of which the following is a specification.

This invention relates to bird stands especially designed for walking birds, such as macaws, parrots and birds of like character.

An object of the present invention is the provision of a stand of ornamental character in which the perch, feed and water containers are located centrally above a tray, so that the latter will effectually prevent seed from dropping upon the floor, while the character of the tray will prevent the seed from leaving the tray when fanned by the wings of the bird when the latter is exercising.

Another object of the invention is the provision of a stand from which the tray and feed and water containers are removable for convenience in cleaning, so that the stand may be kept in a clean and sanitary condition.

Another object of the invention is the provision of a bird stand which, while having an ornamental appearance, is constructed so that it may be cheaply manufactured and readily assembled or taken apart.

With the above and other objects in view, the invention further includes the following novel features and details of construction, to be hereinafter more fully described, illustrated in the accompanying drawings and pointed out in the appended claims.

In the drawings:—

Figure 4 is a perspective view showing the individual feed and water cups removed from their receptacle.

Figure 5 is an enlarged sectional view taken substantially on the line 5—5 of Figure 2.

Figure 1:
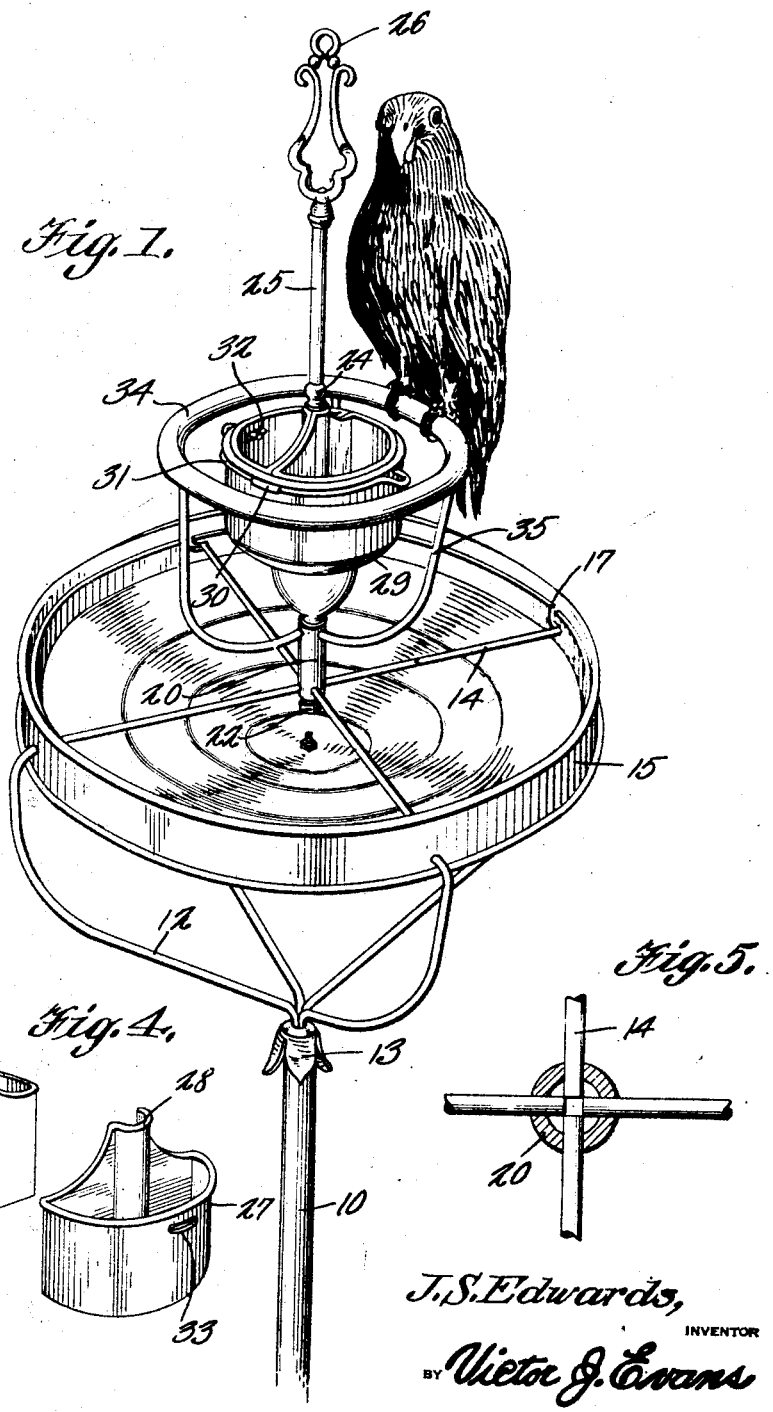
Figure 1 is a perspective view showing the upper portion of a bird stand constructed in accordance with the invention with a bird mounted upon the perch.
Figure 2:
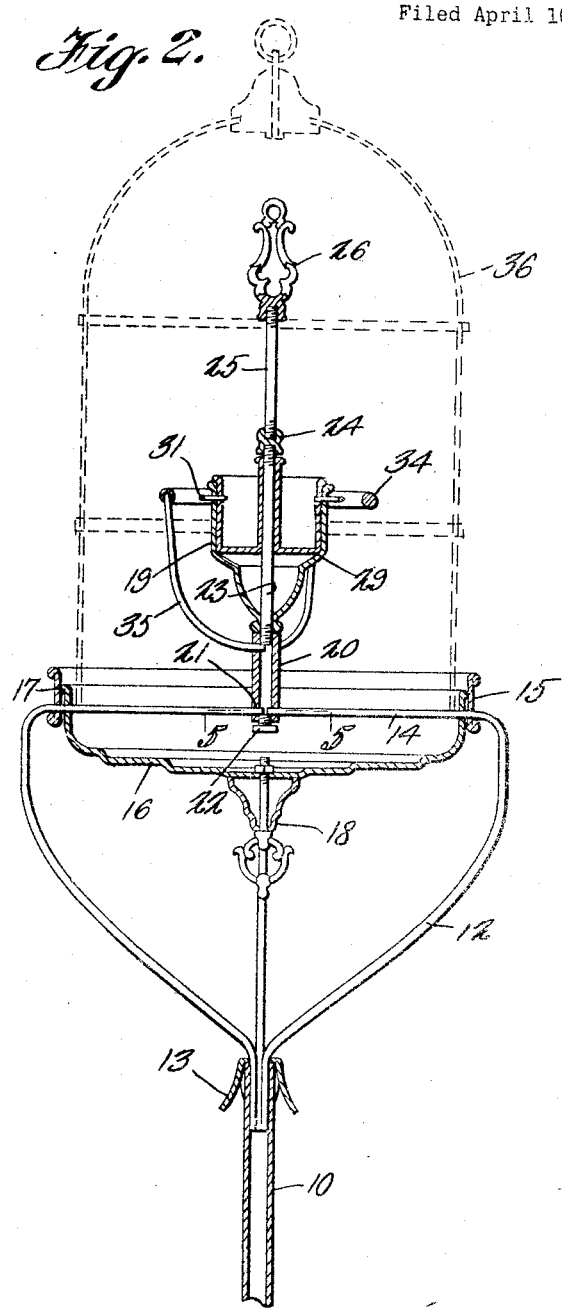
Figure 2 is a vertical sectional view taken through the upper part of the stand with a cage shown by dotted lines.
Figure 3:
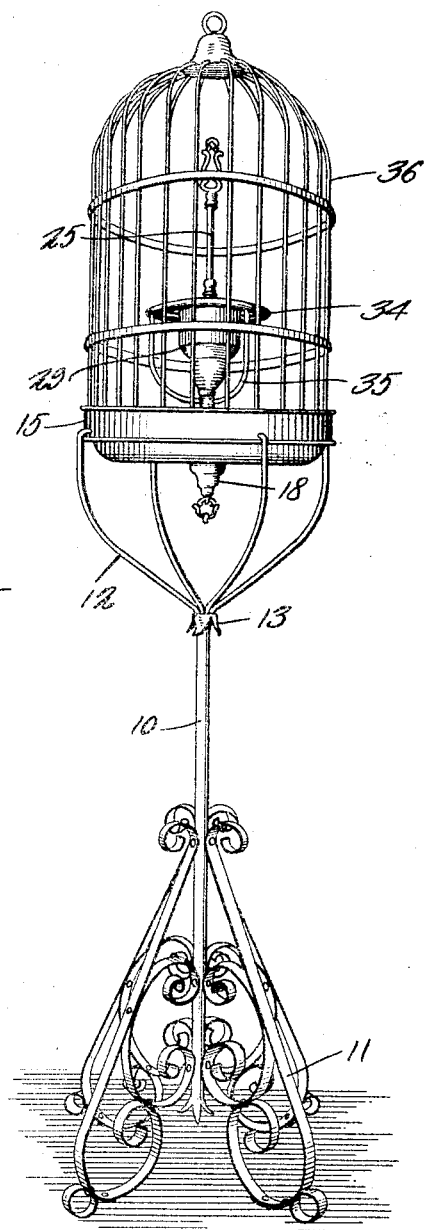
Figure 3 is a view showing the stand complete.

Referring to the drawings in detail wherein like characters of reference denote corresponding parts, the reference character 10 indicates a standard which is shown as of hollow tubular construction and which is supported in vertical position by means of feet 11, the latter being of any suitable ornamental character.

This standard supports a frame and the latter includes radially disposed rods 12 which extend upwardly and outwardly from the upper end of the standard 10. The lower ends of these rods preferably extend through a suitable ornament 13 which provides a cap for the standard 10. The upper ends of the rods 12 extend inwardly and radially and provide horizontal portions 14 upon which is mounted an annular member or band 15. While this member is shown as of circular form, it may be square, octagonal or of any suitable configuration.

Removably positioned within the band 15 is a tray 16. This tray includes an annular marginal flange 17 which is shaped to conform to the shape of the band 15 and is detachably held in place so that it may be removed for cleaning. Various means may be employed for securing the tray in position, the means shown consisting of bayonet slots 17' which receive the horizontal portions 14 of the rods 12. Extending downwardly from the tray is an ornamental device 18 which, in addition to increasing the attractiveness of the stand, provides a handle for convenience in removing and replacing the tray.

Mounted centrally above the tray 16 is a receptacle 19 which, while shown as of cylindrical form, may be of any suitable design or shape. Extending downwardly from the receptacle 19 is a post 20 whose lower end is provided with radially disposed openings 21 for the reception of the free ends of the horizontal portions 14 of the rods 12. A binding screw 22 which extends into the bottom of the post 20 engages the inner ends of the rods and acts to connect said rods and hold the receptacle 19 in position.

The post 20 is of tubular construction and is connected to the lower end of the receptacle 19 by the inner threaded end of a rod 23. This rod extends upwardly and centrally through the receptacle and is connected by an ornamental coupling 24 to the lower end of a rod 25, while the upper end of this last mentioned rod is surmounted by an ornament 26 which may provide a handle for convenience in moving the stand about.

Removably positioned within the receptacle 19 are feed and water containers 27 of like construction. Each of these containers is substantially semi-circular in shape and is provided with a groove 28 to accommodate the rod 23, a shoulder 29 in the bottom of the receptacle acting in conjunction with this rod to support the receptacle. Secured to the outer periphery of the receptacle 19 as indicated at 30 is a substantially semi-circular spring arm 31. The opposite ends of this arm terminate in radially disposed fingers 32 which extend through openings provided in the receptacle and detachably engage the containers 27, the latter being provided with slots 33 to receive the fingers 32.

Extending around and spaced from the receptacle 19 is an annular perch 34 which is supported by arms 35 extending from the post 20.

It will be seen from the foregoing description and accompanying drawings that the invention provides a bird stand wherein the perch and feed and water containers are located centrally above the tray so that the latter will prevent dropped seed from falling upon the floor around the stand. In addition, the depth of the tray and its location with respect to the perch will prevent the wings of the bird when exercising from fanning the dropped seed upon the floor.

It will be further evident that the tray 16 may be readily removed and replaced for convenience in cleaning, while the containers 27 may also be conveniently removed and replaced. If desired, the receptacle and perch which is of a unitary structure may be detached from the rods 12 by loosening the binding screw 22.

If desired, a cage 36 may be positioned within the band 15 so as to enclose the bird.

The invention is susceptible of various changes in its form, proportions and minor details of construction and the right is herein reserved to make such changes as properly fall within the scope of the appended claims.

Having described the invention what is claimed is:—

1. A bird stand comprising a supporting frame including horizontally disposed radially extending rods, a tray detachably engaging the rods, a receptacle supported by the rods centrally above the tray, feed and water containers removably located within the receptacle and a perch located adjacent the containers.

2. A bird stand comprising a supporting frame including horizontally disposed radially extending rods, a tray detachably engaging the rods, a receptacle supported by the rods centrally above the tray, feed and water containers removably located within the receptacle, means carried by the receptacle and detachably engaging the containers to hold the latter within the receptacle and a perch located adjacent the containers.

3. A bird stand comprising a supporting frame including horizontally disposed radially extending rods, a tray detachably engaging the rods, a receptacle supported by the rods centrally above the tray, feed and water containers removably located within the receptacle, a spring arm secured to the receptacle, oppositely located radially movable fingers at opposite ends of the arm, said fingers extending through the receptacle for detachable engagement with the containers to hold the latter within the receptacle and a perch located adjacent the containers.

4. A bird stand comprising a supporting frame including horizontally disposed radially extending rods having their free ends located centrally of said frame, a tray detachably engaging the rods, a receptacle, means extended from the bottom of the receptacle and engaging the free ends of the rods to connect said ends and support the receptacle centrally above the tray, feed and water containers removably located within the receptacle and a perch located adjacent the containers.

5. A bird stand comprising a supporting frame including horizontally disposed radially extending rods having their free ends located centrally of said frame, a tray detachably engaging the rods, a receptacle, means extending from the bottom of the receptacle and engaging the free ends of the rods to connect said ends and support the receptacle centrally above the tray, feed and water containers removably located within the receptacle, a perch located adjacent the containers and means extending from the receptacle supporting means to support the perch.

6. A bird stand comprising a supporting frame including horizontally disposed radially extending rods, a tray detachably engaging the rods, a receptacle supported by the rods centrally above the tray, feed and water containers removably located within the receptacle and a perch extending around the containers.

7. A bird stand comprising a supporting frame including horizontally disposed radially extending rods having their free ends located centrally of said frame, a tray detachably engaging the rods, a receptacle, means extending from the bottom of the receptacle and engaging the free ends of the rods to connect said ends and support the receptacle centrally above the tray, feed and water containers removably located within the receptacle, a perch located adjacent the containers and a cage enclosing the containers and perch, said cage having its lower end resting within the frame and engaging the rods.

8. A bird stand comprising a supporting standard, a frame including an annular horizontally disposed band, rods extending upwardly and radially from the standard and supporting the band, said rods terminating in horizontally disposed inwardly extending portions with their free ends located centrally of the band, a tray detachably engaging the rods, a receptacle, means extending from the bottom of the receptacle and engaging the free ends of the rods to connect said rods and support the receptacle centrally above the tray, feed and water containers within the receptacle, a perch extending around the receptacle and means to support the perch from the receptacle supporting means.

In testimony whereof I affix my signature.

JOSEPH S. EDWARDS.